W. H. ADSIT.
CHANGE SPEED GEAR OPERATING MEANS FOR MOTOR VEHICLES.
APPLICATION FILED JAN. 29, 1919.
1,380,337.
Patented June 7, 1921.
5 SHEETS—SHEET 1.
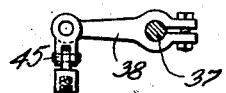
Fig. 1
Fig. 6.

W. H. ADSIT.
CHANGE SPEED GEAR OPERATING MEANS FOR MOTOR VEHICLES.
APPLICATION FILED JAN. 29, 1919.
1,380,337.
Patented June 7, 1921.
5 SHEETS—SHEET 2.
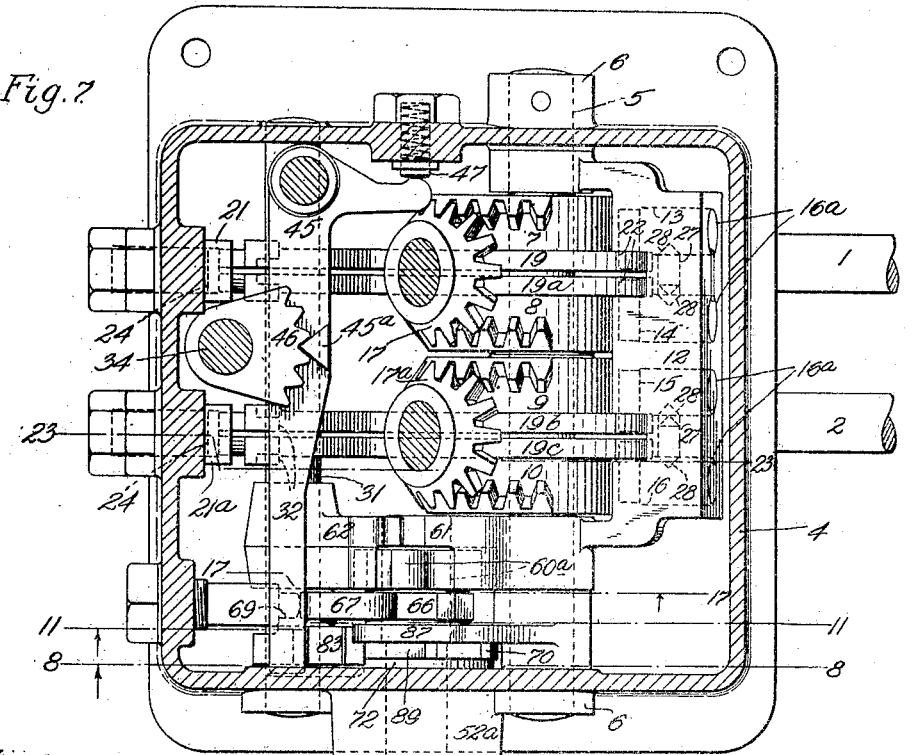
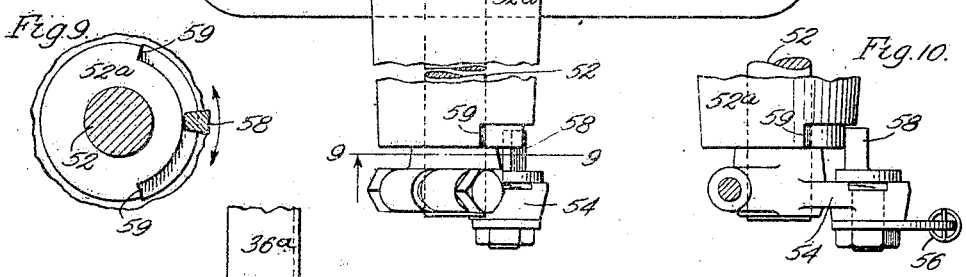
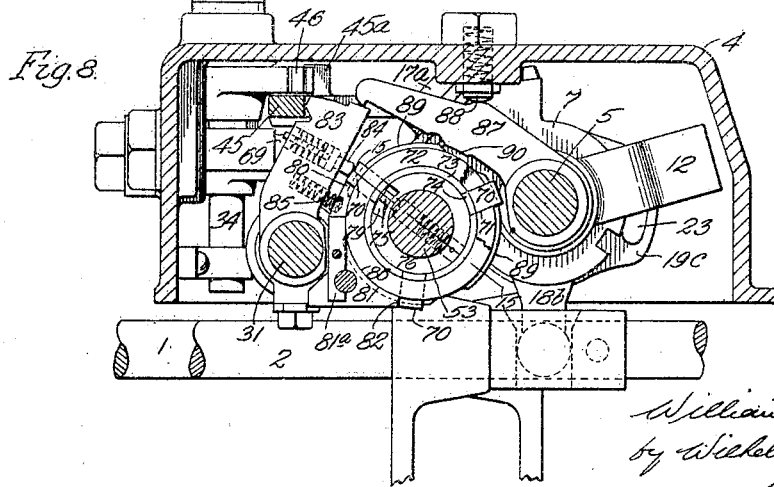
INVENTOR.
William H. Adsit,
by Wilhelm & Parker.
ATTORNEYS.

W. H. ADSIT.
CHANGE SPEED GEAR OPERATING MEANS FOR MOTOR VEHICLES.
APPLICATION FILED JAN. 29, 1919.
1,380,337.
Patented June 7, 1921.
5 SHEETS—SHEET 3.
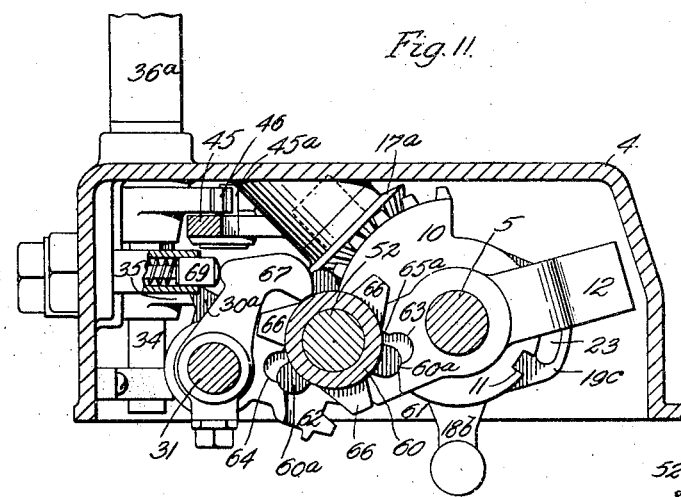
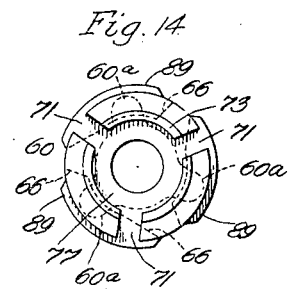
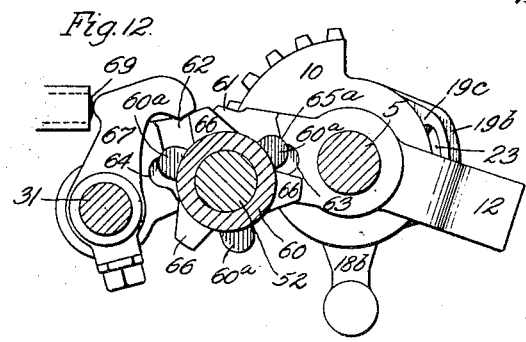
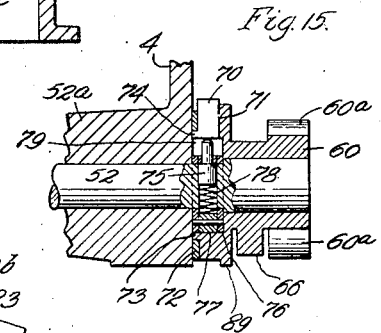
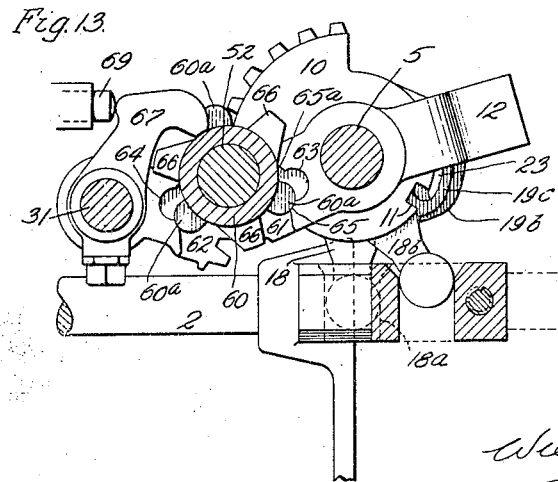
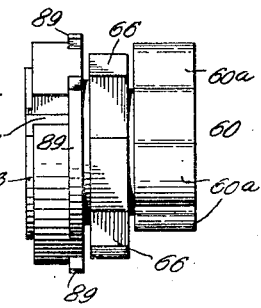
INVENTOR.
William H. Adsit,
By Wilhelm & Parker.
ATTORNEYS.

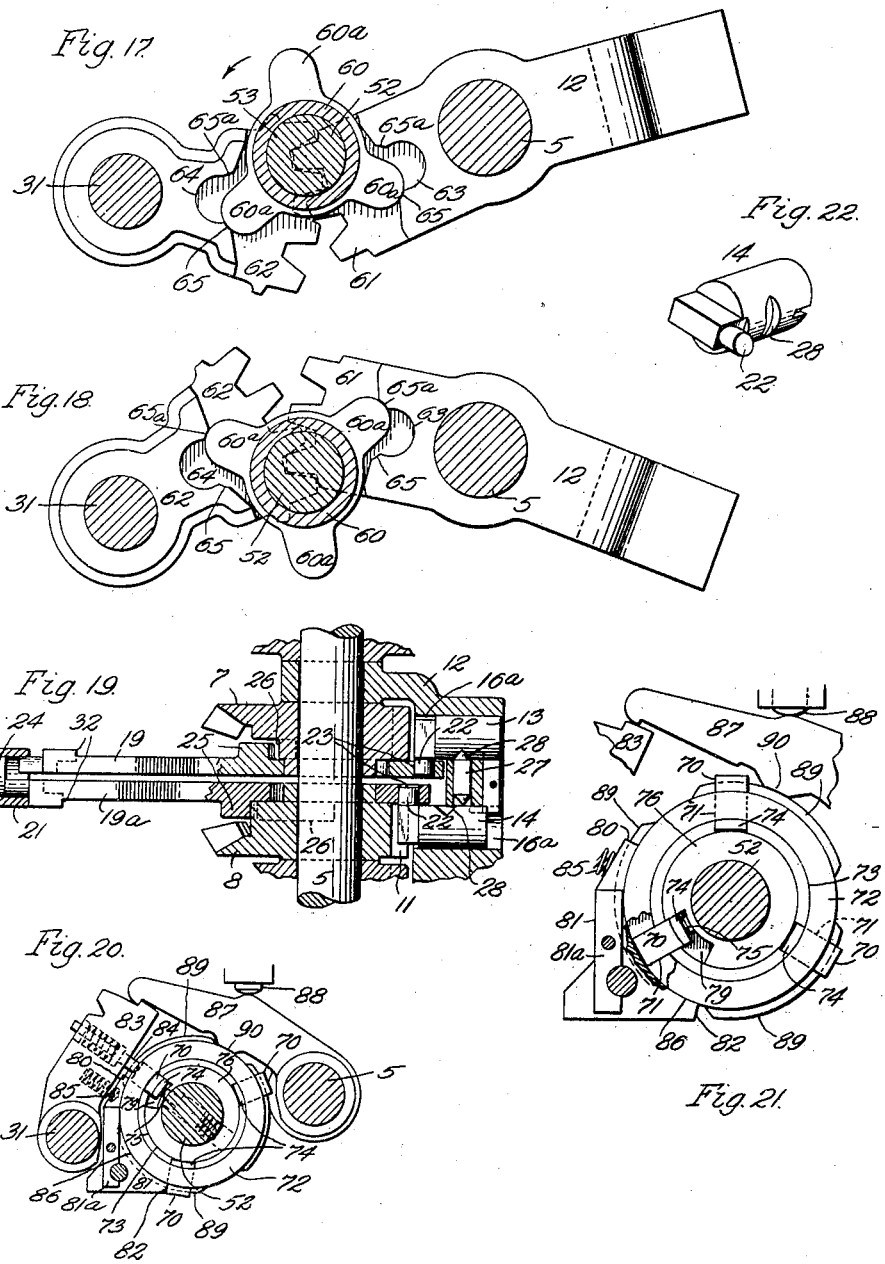

W. H. ADSIT.
CHANGE SPEED GEAR OPERATING MEANS FOR MOTOR VEHICLES.
APPLICATION FILED JAN. 29, 1919.
1,380,337.
Patented June 7, 1921.
5 SHEETS—SHEET 5.
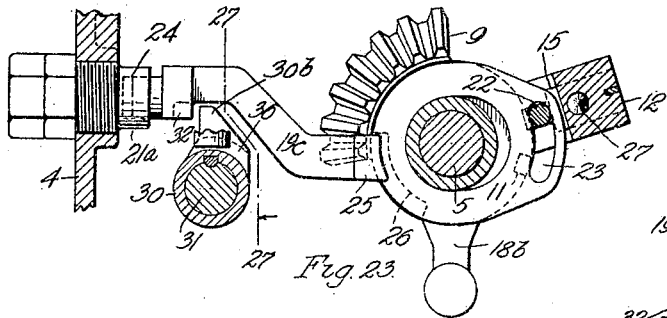
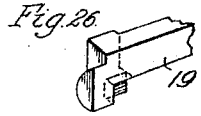
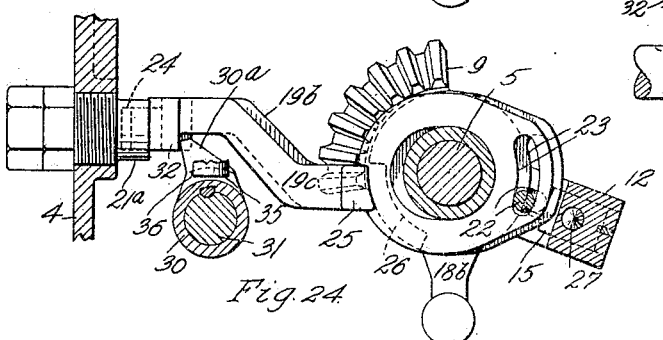
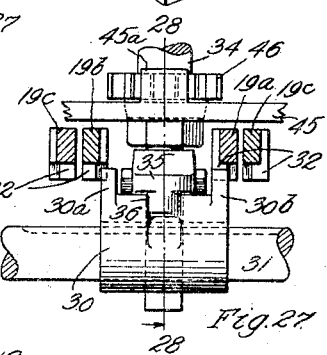
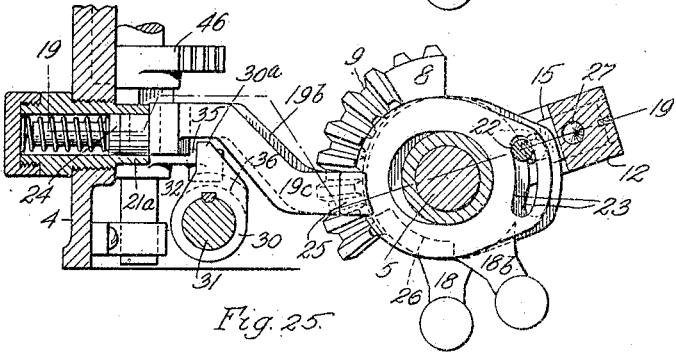
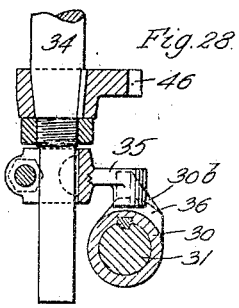
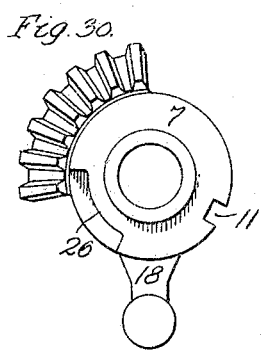
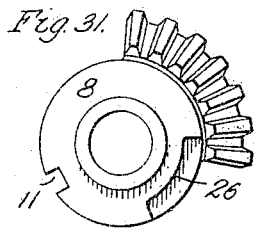
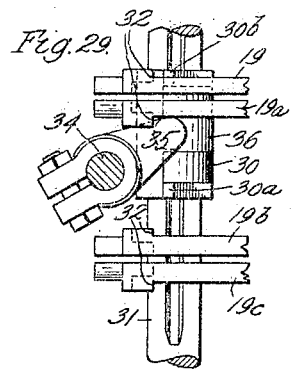
INVENTOR.
William H. Adsit,
by Wilhelm & Parker
ATTORNEYS.

UNITED STATES PATENT OFFICE.

WILLIAM H. ADSIT, OF BATAVIA, NEW YORK, ASSIGNOR OF ONE-HALF TO DANIEL W. TOMLINSON, JR., OF BATAVIA, NEW YORK.

CHANGE-SPEED-GEAR-OPERATING MEANS FOR MOTOR-VEHICLES.

1,380,337.     Specification of Letters Patent.     Patented June 7, 1921.

Application filed January 29, 1919. Serial No. 273,838.

*To all whom it may concern:*

Be it known that I, WILLIAM H. ADSIT, a citizen of the United States, residing at Batavia, in the county of Genesee and State of New York, have invented a new and useful Improvement in Change-Speed-Gear-Operating Means for Motor-Vehicles, of which the following is a specification.

In transmissions or change speed gears of the kind which are commonly employed at the present time on motor vehicles for reversing the motion of the vehicle and changing the gear ratio with which the engine operates the driving wheels, the movable gears are shifted by a lever which the driver must actuate by hand while he holds the vehicle clutch released by pressing down the clutch pedal. In my copending application Serial No. 20,430, filed April 10, 1915, is disclosed a mechanism by means of which the driver can, by the manipulation of a light, easily operated selecting device, preferably located on the steering column, select or determine the gearing which he desires to use, and thereafter place the selected or predetermined gearing into action simply by actuating the usual clutch pedal.

The objects of the invention are to provide a practical and desirable mechanism of novel construction for a similar purpose, whereby the driver can, either while the vehicle is at rest or in motion at any speed, select the gearing desired for use, and at any time thereafter place the selected gearing into action simply by operating the clutch pedal; also to construct the mechanism so that its whole cycle of operations is completed by a single forward movement of the clutch pedal, and so that the gears are shifted by the manual actuation of the pedal without the use of any actuating spring or other power device; also to entirely release the clutch pedal from the mechanism after the gears are shifted, to enable the free partial or full movements of the pedal for operating the clutch in the usual way; also to enable the gear selection to be made regardless of the position of the clutch pedal, whether it is pushed forward for stopping the vehicle, or is in its normal retracted or other position; also to construct the mechanism so that a full forward movement of the pedal is necessary for its operation, and if the pedal is moved only partway and then released, engaging the clutch, after setting the selecting device, the parts will be returned to the neutral position, thereby avoiding trouble by an incomplete movement of the mechanism; also to insure a free, easy-operating mechanism, and one which is proof against trouble in the hands of an inexperienced or careless driver; and also to improve mechanisms of the character described in the other respects hereinafter described and set forth in the claims.

In the accompanying drawings:

Figure 1 is a side elevation of a change speed gear operating mechanism embodying the invention and showing the relation of the same to the change speed gear casing, clutch pedal and steering column of a motor vehicle.

Fig. 2 is a top plan view of the steering wheel and the selecting lever.

Fig. 3 is a fragmentary rear elevation thereof at right angles to Fig. 1.

Fig. 4 is a sectional plan view of the link connections between the selecting lever and the selector operating shaft.

Fig. 5 is a vertical sectional elevation, on an enlarged scale, of the lower part of the selector operating mechanism, on line 5—5, Fig. 1.

Fig. 6 is a horizontal section thereof on line 6—6, Fig. 5.

Fig. 7 is a sectional plan view of the change speed gear operating mechanism with all parts thereof in their normal positions.

Fig. 8 is a longitudinal sectional elevation thereof on line 8—8, Fig. 7.

Fig. 9 is a fragmentary sectional elevation thereof on line 9—9, Fig. 7.

Fig. 10 is a fragmentary sectional plan view thereof showing a different position of the stop for the clutch pedal.

Fig. 11 is a sectional side elevation of the change speed gear operating mechanism on line 11—11, Fig. 7.

Fig. 12 is a fragmentary similar view thereof with the parts in the position wherein a gear has been selected.

Fig. 13 is a similar view showing the position of the parts after the shifting movement has been completed.

Fig. 14 is an end elevation of the actuating cam detached from the device.

Fig. 15 is a transverse vertical section of the cam device on line 15—15, Fig. 8.

Fig. 16 is a side elevation, on an enlarged scale, of the cam shown in Fig. 14.

Figs. 17 and 18 are side elevations of the dog carrier and the actuating means therefor, on an enlarged scale, on line 17—17, Fig. 7, respectively showing these parts in the same positions as in Figs. 11 and 12.

Fig. 19 is a fragmentary sectional plan view on line 19—19, Fig. 25, with one of the dogs in operative connection with one of the gear shifting wheels.

Fig. 20 is a fragmentary sectional elevation of the cam and holding catch for the selector shaft.

Fig. 21 is a similar view, on a larger scale, with the cam and catch in released position.

Fig. 22 is a perspective view of one of the dogs for the gear shifting wheels.

Figs. 23, 24 and 25 are vertical sectional elevations of the mechanism on line 23-23, Fig. 7, respectively showing the parts in the same positions as in Figs. 11, 12 and 13.

Fig. 26 is a fragmentary perspective view of the front end of one of the dog actuators.

Fig. 27 is a transverse sectional elevation on line 27—27, Fig. 23, showing the selector in operative position for the first forward speed.

Fig. 28 is a vertical sectional elevation thereof on line 28—28, Fig. 27, omitting some of the parts shown in Fig. 27.

Fig. 29 is a fragmentary plan view thereof.

Figs. 30 and 31 are elevations of two of the gear shifting wheels.

A, Fig. 1, represents a portion of the casing of the transmission or change speed gear B, C the steering column and D the clutch pedal of a motor vehicle, these parts being constructed and operating in a well known manner. The transmission may be of any usual or approved construction and it is not shown or described in detail herein.

1 and 2 represent the two gear shifting rods of the transmission. These rods are, as usual, arranged parallel with each other to slide endwise in the gear casing A. The shifting or operating mechanism is shown in the drawings in connection with a transmission which gives three different speeds in a forward direction and a reverse motion of the vehicle, two of the gear trains being placed in action by opposite movements of one of the shifting rods, 1, and the other two gear trains being placed in action by opposite movements of the other shifting rod 2. The mechanism which actuates the gear shifting rods 1 and 2 and forms part of the subject of this invention, is preferably located in a housing or casing 4 which is bolted or otherwise removably secured on the gear casing A in place of the usual cover or top plate of the latter.

5 represents a shaft which extends transversely in the casing 4 above the gear shifting rods 1 and 2 and is supported in suitable bearings 6 at the opposite sides of the casing 4. Gear shifting wheels or gears 7, 8, 9 and 10 are mounted to turn freely on the shaft 5, there being in the construction shown four of these wheels, two for each of the gear shifting rods 1 and 2. Each of the gear shifting wheels has a series of bevel gear teeth on one portion of its periphery and a notch 11 for the engagament of a dog for turning the wheel, the remaining portion of the periphery of the gear being preferably cylindrical. 12 represents an oscillatory yoke or dog-carrier which carries a series of dogs or devices 13, 14, 15 and 16, adapted to be engaged with the gear shifting wheels 7, 8, 9 and 10, respectively, for turning the latter when the dog-carrier swings upwardly. In the construction shown, the yoke is of substantially U-shape, having a cross bar or portion which extends substantially parallel with the shaft 5 adjacent to the peripheries of the shifting gears, and end legs provided with bearing rings which encircle and are adapted to turn on the shaft 5 adjacent to its bearings. Each of the dogs 13—16 is arranged to slide toward and from the companion gear shifting wheel in a pocket $16^a$, Figs. 7 and 19, in the cross bar of the dog-carrier, and each dog preferably has a reduced rectangular inner end adapted to move into and out of the notch 11 in the coöperating gear shifting wheel. In the normal or neutral position of the parts, in which all of the gear trains of the transmission are out of action, the several dogs 13—16 are retained, as hereinafter described, in their retracted positions (indicated in Fig. 7) out of engagement with the gear shifting wheels 7—10, so that the dog-carrier can be rocked up and down without the dogs engaging and operating any of the gear shifting wheels. If the dog-carrier is swung downwardly until the dogs are brought to a position opposite the notches 11 of the gear shifting wheels, and one of the dogs is moved into the notch 11 in the companion gear shifting wheel, then, when the dog-carrier is swung upwardly again, this gear shifting wheel will be turned therewith.

The wheels 7 and 8 are connected, as for instance, by a bevel pinion 17 meshing with the teeth on the two wheels and suitably journaled in the casing 4, so that when one of the wheels is turned by its dog the other wheel will be turned in the opposite direction. The wheels of the other pair, 9—10, are similarly connected by a bevel pinion $17^a$. And one wheel of the pair 7—8 is connected to the gear shifting rod 1, for instance, by an arm 18 on the wheel 7 entering a socket $18^a$ in the shifting rod, while one wheel of the other pair 9—10 is connected to the other shifting rod 2, as by a similar arm 18[b] on the wheel 9. Therefore if the wheel 7 is turned in a left-hand direction by its dog 13, the shifting rod 1 will be moved to the right in Fig. 8, while a similar movement of the wheel 8 by its dog will produce an opposite movement of the shifting rod. Likewise the other shifting rod 2 is moved in one direction by turning the wheel 9, and in the opposite direction by a similar turning of the wheel 10. Thus while all of the gear shifting wheels are turned in the same direction by their dogs 13—16, the shifting rods are moved in one or the other direction, depending upon which of the wheels is actuated.

The dogs 13—16 are moved into and out of connection with the gear shifting wheels by dog-actuators or bars 19, 19[a], 19[b], 19[c], of which there is one for each dog. These actuators extend forwardly from the dogs and are arranged in two pairs, one pair 19, 19[a] located side by side between the two wheels 7 and 8, and the other pair located between the other two wheels 9 and 10. The dog actuators have elongated loop-shaped rear ends which surround and slidably bear on the hubs of the adjacent gear shifting wheels, and the front ends of one pair of actuators 19, 19[a] enter a guide sleeve or bearing 21 at the front of the casing 4, while the front ends of the other pair of actuators enter a similar guide bearing 21[a].

Each of the dogs 13—16 is connected to one of the actuators by a lateral stud 22 (Fig. 19) projecting from the dog into a curved slot 23 in the rear end of the actuator. These slots permit the dogs to rock with the dog carrier but cause the dogs to move toward or from the gear shifting wheels when the actuators are moved endwise. Spring plungers 24 in the guide bearings 21, 21[a] normally hold the actuators in the rearward position shown in Figs. 7 and 23, with the dogs out of engagement with the gear shifting wheels. In this position lugs 25 on the sides of the actuators extend into recesses 26 in the end faces of the wheels and by engagement with the ends of these recesses prevent the turning of the gear shifting wheels. When the actuator has been moved forwardly to engage its dog in the notch 11 of the companion gear shifting wheel and the wheel is turned by the dog, the cylindrical periphery of the wheel engages the lug 25 as shown, in the case of the actuator 19[a] in Fig. 19, and holds the dog in connection with the wheel until the wheel is returned to its normal position.

In order to prevent the operation of more than one actuator and dog at a time, a locking pin 27 is preferably arranged to slide laterally in a hole in the dog carrier 12 between the two dogs of each pair (see Figs. 7 and 19). This pin has conical ends which, in the retracted positions of the dogs, registers with conical seats 28 in the sides of the two dogs and the pin is of such length that if one dog is moved it will shift the pin so that its opposite end will enter the seat in the other dog and lock the latter from movement. Any other suitable means for this purpose could be employed.

The dog actuators are moved for coupling the dogs with their respective gear shifting wheels by a selector or device 30 which is splined on a rock shaft 31 extending transversely beneath the dog actuators and is adapted to be slid on said shaft so as to place one of two lugs 30[a], 30[b] on the selector in position to engage a shoulder 32 on one or another of the dog actuators. In the position shown in Fig. 27 the lug 30[b] of the selector is in position to engage the shoulder 32 of the actuator 19[a], while the other lug 30[a] is located where it will not engage any of the actuators. If the selector shaft 31 is then rocked to the left as shown in Fig. 24, the selector, which rocks with the shaft, will move the actuator 19[a] forwardly for coupling its dog to the companion gear shifting wheel 8. This is the position for the first forward speed. If the selector is moved to the right in Fig. 27 until the lug 30[b] is in a plane between the shoulders 32 of the two actuators 19 and 19[a], the other lug 30[a] will be in a plane at the right of the actuator 19[b]. The selector shaft and selector can then be rocked without moving any of the actuators. This is the neutral position. By appropriate movements of the selector to the right or left, one or the other of its lugs 30[a], 30[b] will be placed in position for moving one or another of the four dog actuators when the selector shaft is rocked. In each operative position of the selector, when one of its lugs is in operative relation to one of the dog actuators, the other lug of the selector will be located where it cannot engage another dog actuator, so that only one dog actuator will be operated when the selector is rocked in any operative position thereof. The described construction and arrangement of the selector and dog actuators enables the selector to be shifted from one to another of its five different operative positions by short movements of equal extent.

The selector 30 is shifted to place it in the several operative positions or the neutral position mentioned, by suitable mechanism preferably including an operating handle or lever which is mounted on the steering column where it can be easily reached and moved by the driver. The mechanism shown for this purpose is constructed as follows:

34 (Figs. 5, 7, 8, 27–29) is a vertical shaft suitably journaled in the casing 4 and provided with an arm 35 having a finger at its end entering a groove 36 in the selector 30 and adapted to slide the selector on the shaft 31 when the vertical shaft 34 is turned. This shaft is connected by a coupling sleeve 36ª or otherwise to an upright shaft 37, Fig. 1, which is connected by an arm 38, link 39, knuckle joints 40, and arm 41 to an operating shaft 42 extending along and suitably journaled on the steering column. This shaft 42 is adapted to be turned by an operating lever or handle 43 of any suitable kind secured to the upper end of the shaft and arranged to swing over a quadrant 44 which is provided with characters to show the positions to which the lever should be moved for placing the selector 30 in its neutral and several operative positions. In order to place the selector in any desired position, it is only necessary to move the operating lever 43 into register with the character on the quadrant indicating that position.

45, Fig. 7, represents a spring-actuated detent or lever provided with a V-shaped lug 45ª adapted to engage in V-shaped notches in a sector 46 secured to the vertical shaft 34 for insuring the placing of the selector 30 accurately in its several positions, and releasably holding it in such positions. The detent is actuated by a suitable spring plunger 47. Any other suitable operating mechanism for the selector could be employed.

After the selector 30 has been set as explained, to determine which of the gear shifting wheels 7—10 is to be actuated, the dog carrier 12 and the selector are oscillated for engaging the requisite dog with the selected wheel and for turning said wheel. This is preferably done through the medium of the clutch pedal D by the following mechanism.

The clutch pedal D, see Fig. 1, is secured as usual to a suitably journaled rock shaft 50 which is operatively connected in any usual or suitable way with the vehicle clutch. This clutch shaft is provided with an arm 51 which has a lost motion connection with a cam shaft 52 which extends through a suitable bearing 52ª into the casing 4 between the shaft 5 for the dog carrier and the selector shaft 31. As shown, the arm 51 has a hole in its outer end through which passes freely a rod 53 pivotally connected to an arm 54 secured on the cam shaft 52, and the rod 53 has nuts 55 screwed thereon at opposite sides of the arm 51, thus permitting the arm to move the distance between said nuts without moving the rod 53 and cam shaft. This lost motion, which is determined by the adjustment of the nuts 55, allows the clutch pedal to be moved far enough for the usual operation of the clutch without actuating the cam shaft 52. 56, Fig. 1, indicates a suitable spring connected to the arm 54 and to a suitable stationary part 57 for returning the cam shaft 52 to its initial position after actuation by the clutch pedal. The oscillation of the cam shaft 52 in both directions is preferably limited to an arc of 120° by a suitable stop, such as a stud 58 secured to the arm 54 and adapted to engage opposite stop shoulders 59 on the cam shaft bearing. On the cam shaft, within the casing 4, is a cam sleeve 60 which has three teeth or arms 60ª (see Figs. 17 and 18) disposed equidistantly from each other around the sleeve, or 120° apart. The cam sleeve is loose on the cam shaft except when locked thereto as hereinafter explained. One leg of the dog carrier 12, which is adjacent to the cam sleeve 60, is provided with a gear segment 61 which extends beyond the shaft 5 toward the selector shaft, and a gear segment 62 loose on the selector shaft 31 meshes with said gear segment 61 so that when either of these gear segments is rocked the other one will be rocked in the opposite direction. The gear segment 61 is provided in one face thereof at one side of the cam shaft with a recess 63 adapted to be entered by the cam teeth 60ª, and the other segment 62 is provided at the opposite side of the cam shaft with a similar recess 64 also adapted to be entered by the cam teeth 60ª. Fig. 17 shows the normal position of these parts. If the cam sleeve 60 is turned one-third of a revolution to the left, as indicated by the arrow, one of its teeth will enter the recess 63 and swing the dog carrier 12 to the position shown in Fig. 18, and the intermeshing teeth of the two segments will cause the segment 62 to swing to the position shown in Fig. 18. After this movement of the segments the tooth 60ª, which is shown at the top in Fig. 17, will enter the recess 64 in the gear segment 62 and rock the segment 62, and also the intermeshing dog carrier 12, back to the initial position shown in Fig. 17. This oscillation of the dog carrier from the position shown in Fig. 17 to that shown in Fig. 18 and back again, is produced during one-third of a revolution of the cam sleeve 60. The gear segment 61 is provided at opposite sides of its tooth recess 63 with two curved locking faces 65 and 65ª, and the other gear segment 62 is provided with similar locking faces at opposite sides of its tooth recess 64. As shown in Fig. 17, two of the teeth 60ª engage the two locking faces 65 and thus lock the gear segment and dog carrier from movement in the normal position. Likewise, when the teeth of the cam engage the other two locking faces 65ª, in the position of the parts shown in Fig. 18, the dog carrier will also be held stationary in this position until the cam teeth 60ª move clear of the locking faces 65ª. It is during this dwell or rest of the dog carrier in the position shown in Fig. 18 that one of the dogs 13—16 is moved into the notch 11 of the companion gear shifting wheel, so that when the dog carrier is returned, one of the gear shifting wheels will be turned with it.

The selector 30 is rocked to move the selected dog actuator and the connected dog for this purpose by the following means:

The cam sleeve 60 is provided with three cam projections 66, see Figs. 11–16. During the movement of the teeth 60ª past the locking faces 65ª one of the cam projections 66 engages an arm 67 fixed to the selector shaft 31 and moves this arm to the position shown in Fig. 12, thereby rocking the selector shaft and selector 30 to the position shown in Fig. 24. This moves one of the dog actuators, depending upon the position of the selector, and engages the dog connected therewith into the notch 11 of the companion gear shifting wheel. When the cam projection 66 has rocked the arm 67 to the position shown in Fig. 12, the projection passes under the overhanging end of the arm 67 and the engagement of the outer end of the cam projection beneath said overhanging end of the arm holds the latter in the position shown in Fig. 12 until the cam projection clears the end of the arm and permits the arm and selector shaft to return to the normal position shown in Fig. 11. The arm and selector shaft are returned to this position by a suitable spring device, such as the spring plunger 69, Figs. 7 and 11–13, which engages the arm 67.

The cam sleeve 60 is locked in the normal position and is prevented from movement by the actuation of the clutch pedal and the cam shaft 52, unless the selector 30 has been first moved to an operative or selecting position, as follows:

70, Figs. 8, 15, 20 and 21 represents three locking bolts or blocks arranged to slide in radial recesses 71 in the outer end of the cam sleeve 60. The bolts are retained in their recesses by a ring 72 which surrounds an annular shoulder 73 on the end of the cam sleeve between the sleeve and the adjacent wall of the casing 4. The bolts 70 have lateral shoulders 74 at their inner ends which project under the inner edge of the ring and limit the outward movement of the bolts. 75 is a bolt actuating plunger arranged to move in a diametrical cavity in the cam shaft 52 and having a reduced outer end which projects through a hole in a ring 76 which is rotatable relatively to the cam sleeve in a circular cavity 77 in the outer end of the cam sleeve. The bolt 75 holds the ring 76 from rotation relatively to the cam shaft 52. The plunger is urged outwardly by a spring 78 arranged between the inner end of the plunger and the end of the plunger cavity. The ring 76 is provided with a peripheral recess 79 into which each of the bolts 70 is adapted to enter when moved inwardly, and the spring plunger projects into this recess and is adapted to engage the inner ends of the bolts 70 to move them outwardly. In the normal position of the locking device shown in Fig. 8, the spring plunger 75 engages the inner end of one of the bolts 70 and holds the same in its outward position with the outer end of the bolt engaging one end 80 of a stationary locking block 81. At the same time the next bolt 70 engages the opposite end 82 of the locking block. The locking block is bolted or otherwise fixed on the adjacent wall of the casing 4, and is preferably provided with a tongue 81ª which projects into a groove in the wall to hold the block from movement. The cam sleeve is thus positively held from movement in either direction and it is necessary to move the bolt 70 inwardly out of engagement with the end 80 of the locking block before the cam sleeve can be turned. 83 represents a releasing arm or device which, as shown, is mounted loosely to turn on the selector shaft 31 with its outer end in position to be engaged and moved by the detent 45 when the latter is actuated in the movement of the selector 30, as above explained. When this detent is moved to the right in Fig. 8 it swings the releasing device 83 toward the cam shaft and presses a spring plunger 84 carried by the releasing device against the outer end of the bolt 70 which engages the end 80 of the locking bolt. 85 is a suitable spring for returning the releasing device to the normal position shown in Fig. 8. The actuating spring for the plunger 84 is stronger than the actuating spring for the bolt actuating plunger 75 so that when the releasing device is moved by the detent 45 the plunger 84 will force the bolt 70 inwardly out of engagement with the locking block and into the recess 79 in the ring 76. The cam sleeve is then free to turn in a left-hand direction, and if the cam shaft 52 is turned in this direction the bolt 70 will pass the end of the locking block and will be held inwardly by engagement with the segmental circular face 86 of the locking block, as indicated in Fig. 21. When the bolt 70 clears this circular face of the locking block, it will be projected outwardly by the spring plunger 75 at the opposite end 82 of the locking block. This movement of the cam sleeve brings the next bolt 70 into position to engage the end 80 of the locking block and when the cam shaft is returned to its initial position the spring plunger 75 will engage the last mentioned bolt 70 and project the same outwardly into locking engagement with the end 80 of the locking block, thus again locking the cam sleeve. In this way the cam sleeve is rotated one-third of a revolution each time the cam shaft 52 is oscillated, provided the cam sleeve has first been released by the actuation of the selector and releasing device 83, and is locked rigidly against movement in either direction at the end of the movement of the cam sleeve. The cam sleeve is turned successive equal movements in the same direction by successive oscillations of the cam shaft.

When the releasing device 83 is moved to retract the bolt 70 it is engaged and held in the position shown in Fig. 20, by a catch 87 which, in the construction shown, is loosely pivoted on the dog carrier shaft 5 and is pressed toward the releasing device by a suitable spring device, such as the spring plunger 88 on the top of the casing 4. Thus, when the releasing device 83 is moved by the detent to move the bolt 70 out of holding engagement with the locking block 81 it is held in this position by the catch and holds the bolt 70 in the released position until the cam sleeve is turned by the operation of the cam shaft and the bolt moved into engagement with the circular face of the locking block. When the cam sleeve is turned, one of three cam ribs or projections 89 on the cam sleeve engages a lug or projection 90 on the catch 87 and moves the catch out of engagement with the releasing device 83, thus permitting the releasing device to be returned by its spring to its normal position shown in Fig. 8. The releasing device is thus restored to position to permit one of the bolts 70 to project outwardly and engage the end 80 of the locking block at the end of the movement of the cam sleeve.

The described locking block positively holds the cam sleeve 60, and consequently the gear shifting mechanism, from movement in the normal positions of these parts, until released by the actuation of the selector 30 and releasing device 83, by moving the selector operating lever 43. In the locked position of the parts the cam shaft 52 can oscillate within the cam sleeve 60 without moving it and therefore the clutch pedal can be actuated for the usual operation of the clutch without effect upon the gear shifting mechanism. If, however, the selector 30 is set in one of its operative positions and the cam sleeve 60 unlocked, as explained, and the clutch pedal is then depressed to the full extent, the cam sleeve will be turned, and through the mechanism described, will engage one of the dogs 13—16 with the corresponding one of the gear shifting wheels 7—10, and this wheel will be turned and place in action the desired transmission gear train. And the entire cycle of operations of the shifting mechanism will be performed during and by the manual forward movement of the clutch pedal. If, after setting the selector for one speed or gear train, the driver desires to use a different speed or gear train, he can move the selector, operating lever 43 to change the selector to the required new position before operating the clutch pedal, and when the pedal is thereafter actuated, the desired gear train will be placed in action. Should the selector be moved when the clutch pedal and the cam shaft are not in their normal positions, the releasing device 83 will be moved to the releasing position and there retained by its catch 87, the releasing plunger 84 being forced back into the releasing device by the locking bolt 70 which is then held from inward movement by the circular face of the ring 76. Then when the cam shaft 52 is returned to its normal position, the spring-actuated releasing plunger 84 will throw the bolt 70 into the recess 79 in the ring 76 and release the cam sleeve 60, permitting the shifting mechanism to be then operated by actuating the clutch pedal. The selector mechanism can, therefore, be set for action regardless of the position of the clutch pedal.

I claim as my invention:

1. The combination with a transmission gearing, of a plurality of gear-shifting members, a companion actuating dog for each of said members normally out of actuating connection with said members, a selector adapted to be moved for selecting for operation one or another of said dogs, means for moving said dogs to a position for connection with said members and then for actuating a selected member after a dog is connected therewith, and means for operating said selector to place the selected dog into actuating connection with the companion gear-shifting member.

2. The combination with a transmission gearing, of a plurality of gear-shifting members, a companion actuating dog for each of said members normally out of atuating connection with said members, a selector adapted to be moved for selecting for operation one or another of said dogs, a carrier for said dogs, means for moving said dog carrier to a position for connecting the dogs with said members and then for actuating a selected member after a dog is connected therewith, and means for operating said selector to place the selected dog into actuating connection with the companion gear-shifting member.

3. The combination with a transmission gearing, of a plurality of gear-shifting members, a companion actuating dog for each of said members normally out of actuating connection with said members, a selector adapted to be moved for selecting for operation one or another of said dogs, a carrier for said dogs, means for moving said dog carrier to a position for connecting the dogs with said members, there holding the dog carrier stationary for an interval, and then moving the dog carrier for actuating a gear-shifting member after a dog is connected therewith, and means for moving the selected dog into actuating connection with the companion gear-shifting member during the interval that the dog carrier is held stationary.

4. The combination with a transmission gearing, of a plurality of gear-shifting members, a companion actuating dog for each of said members normally out of actuating connection with said members, a selector adapted to be moved for selecting for operation one or another of said dogs, a carrier for said dogs, means for moving said dog carrier to a position for connecting the dogs with said members, there holding the dog carrier stationary for an interval, and then moving the dog carrier for actuating a gear shifting member after a dog is connected therewith, and means for operating the selector to move the selected dog into actuating connection with the companion gear shifting member during the interval that the dog carrier is held stationary.

5. The combination with a transmission gearing, of a plurality of gear-shifting members, a companion actuating dog for each of said members normally out of actuating connection with said members, a selector adapted to be moved for selecting for operation one or another of said dogs, an oscillatory carrier for said dogs, means for swinging said dog carrier to a position for connecting the dogs with said members, there holding the dog carrier stationary for an interval, and then swinging the dog carrier back for actuating a gear-shifting member after a dog is connected therewith, and means for moving the selected dog into actuating connection with the companion gear-shifting member during the interval that the dog carrier is held stationary.

6. The combination with a transmission gearing, of a plurality of gear-shifting members, a companion actuating dog for each of said members normally out of actuating connection with said members, a selector adapted to be moved for selecting for operation one or another of said dogs, a manually actuated operating device, and mechanism actuated by said operating device which moves said dogs to a position for connection with said gear-shifting members, moves the selected dog into actuating connection with the companion gear-shifting member, and moves said selected dog for actuating the connected gear-shifting member.

7. The combination with a transmission gearing, of a plurality of gear-shifting members, a companion actuating dog for each of said members normally out of actuating connection with said members, a selector adapted to be moved for selecting for operation one or another of said dogs, a pedal, and mechanism actuated by said pedal which moves said dogs to a position for connection with said gear-shifting members, moves the selected dog into actuating connection with the companion gear-shifting member, and moves said selected dog for actuating the connected gear-shifting member, the whole cycle of operations of said mechanism being performed by and during a single movement of said pedal in one direction.

8. The combination with a transmission gearing, of a plurality of gear-shifting members, a companion actuating dog for each of said members normally out of actuating connection with said members, a selector adapted to be moved for selecting for operation one or another of said dogs, a carrier for said dogs, a pedal, mechanism actuated by said pedal for moving said dog carrier to place said dogs in position for connection with said gear-shifting members and to actuate one of said gear-shifting members after a dog is connected therewith, and means moved by the movement of said pedal for positively moving the selected dog into actuating connection with the companion gear-shifting member.

9. The combination with a transmission gearing, of a plurality of gear-shifting members, a companion actuating dog for each of said members normally out of actuating connection with said members, a selector adapted to be moved for selecting for operation one or another of said dogs, a carrier for said dogs, a manually actuated operating device, mechanism actuated by said operating device for moving said dog carrier to place said dogs in position for connection with said gear-shifting members and to actuate one of said gear-shifting members after a dog is connected therewith, and means moved by the movement of said operating device for positively moving the selected dog into actuating connection with the companion gear-shifting member.

10. The combination with a transmission gearing, of a plurality of gear-shifting members, a companion actuating dog for each of said members normally out of actuating connection with said members, a selector adapted to be moved for selecting for operation one or another of said dogs, a carrier for said dogs, a manually actuated operating device, mechanism actuated by said operating device for moving said dog carrier to place said dogs in position for connection with said gear-shifting members and to actuate one of said gear-shifting members after a dog is connected therewith, and means actuated by said operating device for operating said selector to positively move the selected dog into actuating connection with the companion gear-shifting member.

11. The combination with a transmission gearing, of a plurality of gear-shifting members, a companion actuating dog for each of said members normally out of actuating connection with said members, a selector adapted to be moved for selecting for operation one or another of said dogs, an oscillatory carrier for said dogs, an operating device, mechanism actuated by said operating device for swinging said dog carrier in one direction to place said dogs in position for connection with said gear-shifting members and for swinging said dog carrier back after a dog is connected with one of said gear-shifting members, and means moved by the movement of said operating device for positively moving the selected dog into actuating connection with the companion gear-shifting member.

12. The combination with a transmission gearing, of a plurality of gear-shifting members, a companion actuating dog for each of said members normally out of actuating connection with said members, a selector adapted to be moved for selecting for operation one or another of said dogs, a manually actuated operating device, mechanism actuated by said operating device which moves said dogs to a position for connection with said gear-shifting members, moves the selected dog into actuating connection with the companion gear-shifting member, and moves said selected dog for actuating the connected gear-shifting member, means which normally lock said mechanism from movement by said operating device, and means for releasing said mechanism when said selector is moved to selecting position.

13. The combination with a transmission gearing, of a plurality of gear-shifting members, a companion actuating dog for each of said members normally out of actuating connection with said members, a selector adapted to be moved for selecting for operation one or another of said dogs, an operating device, mechanism normally disconnected from said operating device for placing the selected dog into connection with the companion gear-shifting member and moving said gear-shifting member, means which normally lock said mechanism from movement, and means for releasing said mechanism and operatively coupling it to said operating device when said selector is moved to selecting position.

14. The combination with a transmission gearing, of a plurality of gear-shifting members, a companion actuating dog for each of said members normally out of actuating connection with said members, a selector adapted to be moved for selecting for operation one or another of said dogs, an oscillatory carrier for said dogs, an operating device, means actuated by said operating device for oscillating said dog carrier, means actuated by said operating device for rocking said selector, and means operated by rocking said selector for moving the selected dog into actuating connection with the companion gear-shifting member.

15. The combination with a transmission gearing, of a plurality of gear-shifting members, a companion actuating dog for each of said members normally out of actuating connection with said members, a selector adapted to be moved for selecting for operation one or another of said dogs, an oscillatory carrier for said dogs, mechanism for oscillating said dog carrier and rocking said selector, and a dog actuator connected to each of said dogs, one of said dog actuators being operated by the rocking of said selector to place the connected dog into actuating connection with the companion gear-shifting member.

16. The combination with a transmission gearing, of a plurality of gear-shifting members, a companion actuating dog for each of said members normally out of actuating connection with said members, a selector adapted to be moved for selecting for operation one or another of said dogs, an oscillatory carrier for said dogs, mechanism for oscillating said dog carrier and rocking said selector, a dog actuator connected to each of said dogs, one of said dog actuators being operated by the rocking of said selector to place the connected dog into actuating connection with the companion gear-shifting member, and means for preventing the movement of more than one dog actuator and dog at a time.

17. The combination with a transmission gearing, of a plurality of gear-shifting members, a companion actuating dog for each of said members normally out of actuating connection with said members, a selector adapted to be moved for selecting for operation one or another of said dogs, an oscillatory carrier for said dogs, mechanism for oscillating said dog carrier and rocking said selector, a dog actuator connected to each of said dogs, one of said dog actuators being operated by the rocking of said selector to place the connected dog into actuating connection with the companion gear-shifting member, and means for locking the selected dog in connection with the companion gear-shifting member until the gear-shifting member is returned to the initial position.

18. The combination with a transmission gearing, of a plurality of gear-shifting members, a companion actuating dog for each of said members normally out of actuating connection with said members, a selector adapted to be moved for selecting for operation one or another of said dogs, a shaft, means for rocking the same, a rotatable member normally disconnected from said shaft, means which normally lock said rotatable member from movement by said shaft, means for releasing said rotatable member and operatively coupling it to said shaft when said selector is moved from one selecting position to another, and mechanism actuated by said rotatable member for placing the selected dog in connection with the companion gear-shifting member and moving said gear-shifting member.

19. The combination with a transmission gearing, of a plurality of gear-shifting members, a companion actuating dog for each of said members normally out of actuating connection with said members, a selector adapted to be moved for selecting for operation one or another of said dogs, a carrier for said dogs, a shaft, means for rocking the same, a rotatable member normally disconnected from said shaft, means which normally lock said rotatable member from movement by said shaft, means for releasing said rotatable member and operatively coupling it to said shaft when said selector is moved to selecting position, means by which said rotatable member oscillates said dog carrier in opposite directions, and means by which said rotatable member also places the selected dog into connection with the companion gear-shifting member.

20. The combination with a transmission gearing, of a plurality of gear-shifting members, a companion actuating dog for each of said members normally out of actuating connection with said members, a selector adapted to be moved for selecting for operation one or another of said dogs, a carrier for said dogs, a shaft, means for rocking the same, a rotatable member normally disconnected from said shaft, means which normally lock said rotatable member from movement by said shaft, means for releasing said rotatable member and operatively coupling it to said shaft when said selector is moved to selecting position, means by which said rotatable member oscillates said dog carrier in opposite directions and holds the same stationary for an interval between said opposite movements, and means by which said rotatable member also positively moves the selected dog into connection with the companion gear-shifting member while the dog carrier is stationary.

21. The combination with a transmission gearing, of a plurality of gear-shifting members, a companion actuating dog for each of said members normally out of actuating connection with said members, a selector adapted to be moved for selecting for operation one or another of said dogs, a carrier for said dogs, a shaft, means for rocking the same, a rotatable member normally disconnected from said shaft, means which normally lock said rotatable member from movement by said shaft, means for releasing said rotatable member and operatively coupling it to said shaft when said selector is moved to selecting position, means by which said rotatable member oscillates said dog carrier in opposite directions, and means by which said rotatable member also actuates said selector for placing the selected dog into connection with the companion gear-shifting member.

22. The combination with a transmission gearing, of a plurality of gear-shifting members, a companion actuating dog for each of said members normally out of actuating connection with said members, a selector adapted to be moved for selecting for operation one or another of said dogs, an oscillatory carrier for said dogs, mechanism for oscillating said dog carrier and rocking said selector, a dog actuator connected to each of said dogs, one of said dog actuators being operated by the rocking of said selector to place the connected dog into actuating connection with the companion gear-shifting member, and means whereby said dog actuators when in their normal position lock said gear-shifting members from movement.

Witness my hand, this 27th day of January, 1919.

WILLIAM H. ADSIT.

Witnesses:
H. T. MILLER,
JOHN B. SEAVER.